United States Patent
Tanaka

(10) Patent No.: US 6,950,137 B1
(45) Date of Patent: Sep. 27, 2005

(54) NOISE REDUCTION CIRCUIT FOR CHARGE COUPLED IMAGING DEVICE

(75) Inventor: Takanori Tanaka, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/525,179

(22) Filed: Mar. 14, 2000

(30) Foreign Application Priority Data

Mar. 16, 1999 (JP) .......................... 11-070725

(51) Int. Cl.[7] .......................... H04N 3/14
(52) U.S. Cl. .......................... 348/308
(58) Field of Search .................. 348/241, 294, 348/308, 243, 248, 249, 250; 257/239; 327/436

(56) References Cited

U.S. PATENT DOCUMENTS

| | | | | |
|---|---|---|---|---|
| 5,402,249 A | * | 3/1995 | Koseki et al. | 348/248 |
| 5,467,130 A | * | 11/1995 | Darden et al. | 348/241 |
| 5,936,617 A | * | 8/1999 | Uchino et al. | 348/241 |
| 5,966,172 A | * | 10/1999 | Tsunai | 348/241 |
| 6,018,364 A | * | 1/2000 | Mangelsdorf | 348/241 |
| 6,025,875 A | * | 2/2000 | Vu et al. | 348/241 |
| 6,205,258 B1 | * | 3/2001 | Lin | 382/274 |
| 6,600,513 B1 | * | 7/2003 | Ozumi | 348/311 |
| 6,683,645 B1 | * | 1/2004 | Collins et al. | 348/294 |

FOREIGN PATENT DOCUMENTS

| | | |
|---|---|---|
| JP | 58-108098 | 6/1983 |
| JP | 02-199974 | 8/1990 |
| JP | 06-150685 | 5/1991 |
| JP | 4-018737 | 1/1992 |
| JP | 4-360473 | 12/1992 |
| JP | 10-214956 | 8/1998 |

* cited by examiner

Primary Examiner—Aung Moe
Assistant Examiner—Rashawn N Tillery
(74) Attorney, Agent, or Firm—Hayes Soloway P.C.

(57) ABSTRACT

An integrated noise reduction circuit for a charge coupled imaging device having a floating diffusion type amplifier which converts signal electric charges obtained by photo-electric conversion into a voltage signal. The noise reduction circuit has a biasing circuit which is coupled to an input terminal for receiving an output signal of the charge coupled imaging device via a coupling capacitor and which supplies a predetermined bias potential to the first input terminal, a clamping circuit which clamps each of reset potential output portions of a signal that is supplied from the biasing circuit via a clamping capacitor and that has the predetermined bias potential applied by the biasing circuit to a predetermined reference potential, and a sample and hold circuit which samples and holds signal potential output portions of a signal outputted from the clamping circuit by using sampling pulses.

15 Claims, 5 Drawing Sheets

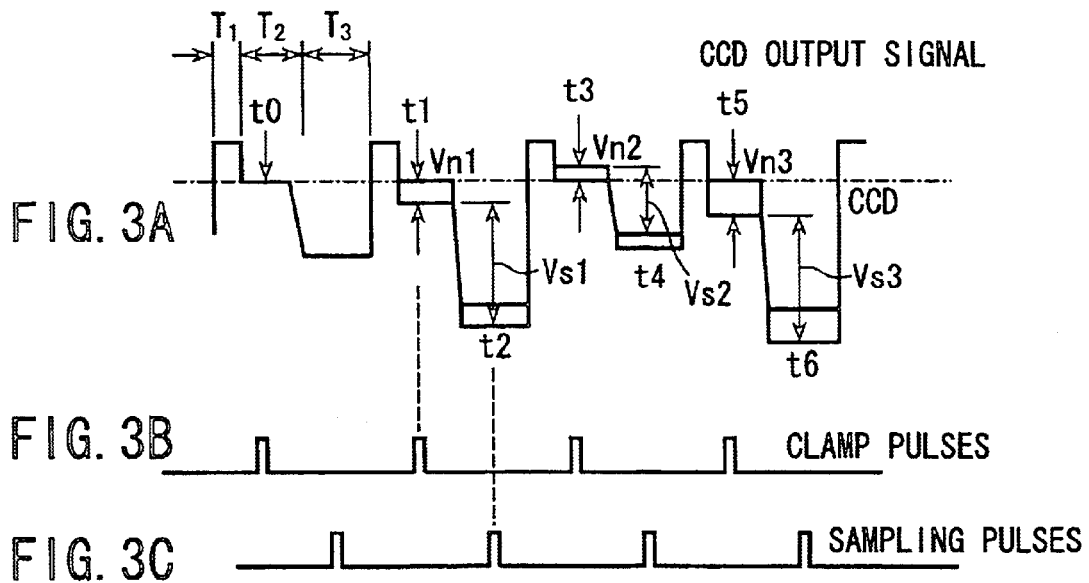
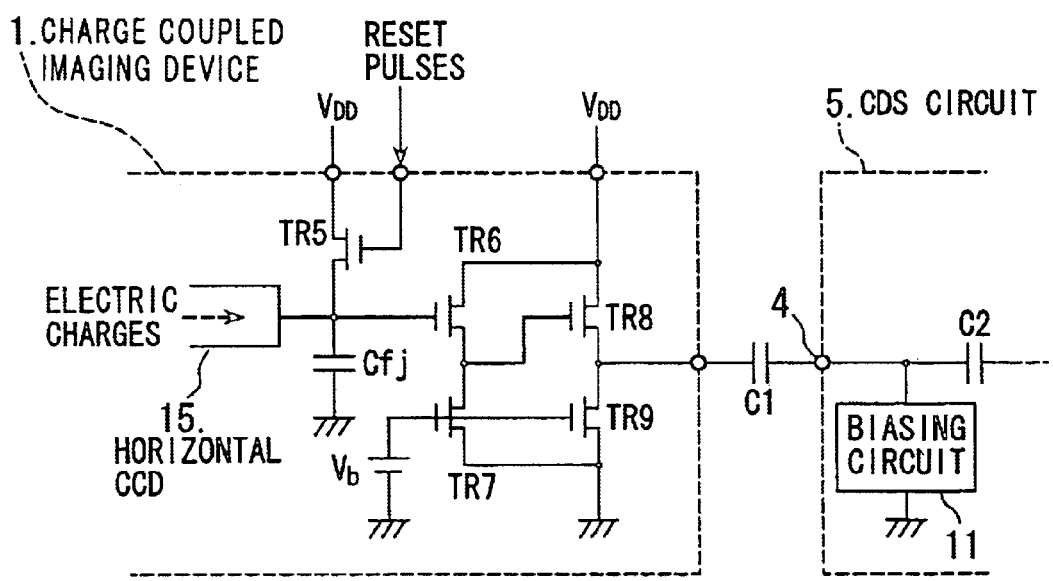

FIG. 5
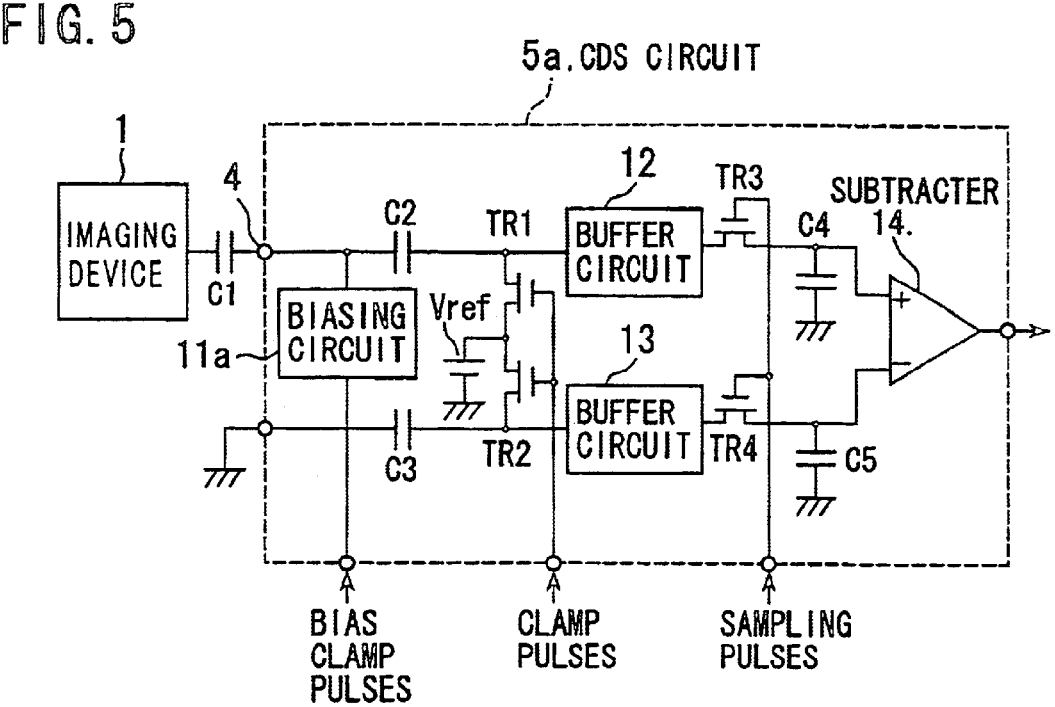
FIG. 6A (CCD) DRIVE PULSES
FIG. 6B CCD OUTPUT SIGNAL
NO SIGNAL PORTION
BLANKING PERIOD / EFFECTIVE SIGNAL PERIOD
FIG. 6C BIAS CLAMP PULSE

PRIOR ART

PRIOR ART

NOISE REDUCTION CIRCUIT FOR CHARGE COUPLED IMAGING DEVICE

FIELD OF THE INVENTION

The present invention relates generally to a noise reduction circuit for a charge coupled imaging device or a charge coupled image pickup device, and more particularly to a noise reduction circuit for a charge coupled imaging device in which reset noises can be sufficiently removed and which is suitable for use in an integrated circuit.

BACKGROUND OF THE INVENTION

A charge coupled imaging device, that is, a CCD type imaging device, has a well known floating diffusion type amplifier at the final stage of the imaging device. The floating diffusion type amplifier converts electric signal charges obtained by the photoelectric conversion in each pixel constituted of a photodiode and the like into a voltage signal. Such floating diffusion type amplifier produces reset noises at the reset operation performed after converting the electric signal charges of each pixel into the voltage signal. In order to reduce or eliminate the reset noises produced by the floating diffusion type amplifier, a well known correlated double sampling (CDS) technology is used for extracting only an image signal in which the reset noises are removed.

FIG. 8 schematically shows an example of a structure of a conventional charge coupled imaging apparatus which uses a charge coupled imaging device or image sensor having a floating diffusion type amplifier. The charge coupled imaging apparatus of FIG. 8 comprises a charge coupled imaging device 1, a buffer circuit 2, a signal processing integrated circuit (a signal processing IC) 21, an image signal processing circuit 8, and a drive pulse generating circuit 9. The charge coupled imaging device 1 is a CCD type imaging device and has the floating diffusion type amplifier not shown in the drawing. The signal processing IC 21 comprises a correlated double sampling circuit 22, an AGC circuit 23 and an A/D converter 24.

In the charge coupled imaging apparatus of FIG. 8, an output signal of the charge coupled imaging device 1 is supplied via the buffer circuit 2 to the correlated double sampling circuit 22 in the signal processing IC 21. The drive pulse generating circuit 9 drives the charge coupled imaging device 1 by supplying appropriate drive pulses thereto. The drive pulse generating circuit 9 also supplies two kinds of pulses, i.e., clamp pulses and sampling pulses 10, which are synchronized with the drive pulses for the charge coupled imaging device 1, to the correlated double sampling circuit 22. The correlated double sampling circuit 22 removes the reset noises of the floating diffusion type amplifier. An output signal of the correlated double sampling circuit 22 in which the reset noises are removed is supplied to the AGC circuit 23 and the amplitude of the output signal is adjusted to a predetermined magnitude. The A/D converter 24 converts an output signal of the AGC circuit 23 into a digital signal which is then supplied to the image signal processing circuit 8 to produce an output image signal.

As a practical method of implementing the correlated double sampling circuit 22, the correlated double sampling circuit 22, the AGC circuit 23 and the A/D converter 24 are integrated into one signal processing IC 21. The signal processing IC 21 is often constituted of a CMOS integrated circuit, because of a power consumption, an integration degree and the like.

FIG. 9 shows an example of a concrete circuit structure of the correlated double sampling circuit 22 and the like among various components of the signal processing IC 21 which is constituted of a CMOS integrated circuit. In FIG. 9, an output signal of the charge coupled imaging device 1 is supplied to a buffer circuit 2. The buffer circuit 2 is constituted of, for example, an emitter follower circuit and the like, and converts a high output impedance of the charge coupled imaging device 1 to a low output impedance. An output signal of the buffer circuit 2 is supplied, via a capacitor C11, to the correlated double sampling circuit 22 which is shown in a box of broken line in FIG. 9 and which is included in the signal processing IC 21 (FIG. 8).

In the correlated double sampling circuit 22, a MOS transistor TR11 and the capacitor C11 compose a clamping circuit, which clamping circuit clamps a reset potential portion in an output signal of the charge coupled imaging device 1 to a predetermined potential Vref by using clamp pulses supplied from the drive pulse generating circuit 9 (FIG. 8). The clamped output signal is then supplied to a buffer circuit 25, and an output signal of the buffer circuit 25 is supplied to a MOS transistor TR13. The MOS transistor TR13 and a capacitor C13 compose a sample and hold circuit which samples and holds a signal potential portion of the output signal of the buffer circuit 25, i.e., the output signal of the charge coupled imaging device 1, thereby an image signal is obtained which is supplied to, for example, a positive input, i.e., a non-inverted input of a subtracting circuit or subtracter 27.

A capacitor C12, a MOS transistor TR12, a buffer circuit 26, a MOS transistor TR14, and a capacitor C14 constitute a circuit having the same structure as the circuit constituted of the capacitor C11, the MOS transistor TR11, the buffer circuit 25, the MOS transistor TR13, and the capacitor C13. An input end of the capacitor C12 is grounded. This circuit is provided for removing an influence of the clamp pulses and the sampling pulses on the above-mentioned image signal supplied to the positive input of the subtracter 27. That is, the output of this circuit is supplied to a negative input or an inverting input of the subtracter 27, and is subtracted from the image signal inputted to the positive input terminal of the subtracter 27, so that an influence of the clamp pulses and the sampling pulses is removed.

In the above-mentioned conventional charge coupled imaging apparatus, the MOS transistor TR11 of the correlated double sampling circuit 22 and the capacitor C11 constitute a clamping circuit, and clamp the reset potential portions of the output signal of the charge coupled imaging device 1 to a predetermined potential Vref by using the clamp pulses supplied from the drive pulse generating circuit 9. As is well known, during periods of the reset potential portions of the output signal from the floating diffusion type amplifier of the charge coupled imaging device, there appear reset noises. The output signal voltage produced from signal electric charges is outputted by using, as a reference potential thereof, the reset potential which is varied by the reset noises. Therefore, as mentioned above, the rest potential portions of the output signal is clamped to the predetermined potential Vref and the reset potential portions are fixed to a constant value to remove the reset noises. Then, by sampling the output signal voltage portions which are produced from signal electric charges and which are outputted by using the constant value as a reference potential, it is possible to obtain an image signal from which the reset noises are removed.

The operation of clamping the reset potential portions to a constant potential value is performed during periods in which the MOS transistor TR11 is turned on by the clamp pulses. However, in order to completely remove the reset noises, it is necessary for the clamping circuit composed of the MOS transistor TR11 and the capacitor C11 to completely clamp the reset potential portions to the constant potential value Vref. Therefore, a time constant determined by the on-resistance of the MOS transistor TR11 and the capacitor C11 must be sufficiently small such that each of the reset potential portions is completely fixed to the constant potential value Vref within a time period corresponding to the pulse width of the clamp pulse.

However, because of the following reason, it is impossible to use the capacitor C11 having a small capacitance value. That is, an input terminal 4 of the correlated double sampling circuit 22 constituted of a CMOS integrated circuit has a parasitic capacitance caused by circuit components of the integrated circuit, that is, a parasitic capacitance caused by bonding pads, wirings, MOS transistors, buffer circuits and the like. Therefore, an input signal is divided by a dividing circuit constituted of the capacitor C11 and the parasitic capacitance, and, therefore, the input signal is attenuated by a ratio determined by the capacitance values of the capacitor C11 and the parasitic capacitance. In order to decrease an influence of the signal division caused by the capacitances to a negligible value, it is necessary to make an attenuation of the input signal equal to or smaller than approximately 1/100. Thus, it is necessary to make the capacitance value of the capacitor C11 sufficiently large, for example, approximately 100 times the parasitic capacitance such that an influence by the parasitic capacitance becomes negligible. Therefore, it is impossible to use the capacitor C11 having a small value.

When the capacitor C11 having a large capacitance is used, it is necessary to sufficiently decrease the on-resistance of the MOS transistor TR11. This is because, it is necessary to make the time constant determined by the on-resistance of the MOS transistor TR11 and the capacitance of the capacitor C11 so small that the reset potential portions are clamped to the constant potential Vref within the time period of the clamp pulse width.

Therefore, it is necessary to use a large size transistor as the MOS transistor TR11, so that the MOS transistor TR11 occupies a large area when the correlated double sampling circuit 22 is implemented by using a CMOS integrated circuit. Also, it is necessary that a reference voltage circuit for providing the constant potential voltage Vref to the capacitor C11 having a large capacitance has a large current supplying ability to avoid variation of the constant potential voltage Vref when the clamping is performed. Thus, the reference voltage circuit must be composed by using large size transistor or transistors, so that the reference voltage circuit occupies a large area in a CMOS integrated circuit. Further, in order for the reference voltage circuit to have a large current supplying ability, it is also necessary to lower an impedance of the reference voltage circuit in addition to enlarging a size thereof. Since the impedance is proportional to a current flowing through the circuit, it is necessary to supply a large bias current, such as approximately several milli-amperes. Therefore, power consumption of the reference voltage circuit becomes large. Still further, in order to drive the capacitor C11 having a large capacitance, it is necessary to couple the buffer circuit 2 having a large driving ability at the output of the charge coupled imaging device 1. Thus, it is necessary to supply a large bias current to the buffer circuit 2, so that power consumption of the CMOS integrated circuit becomes even larger.

In addition to those mentioned above, the conventional charge coupled imaging apparatus has the following drawbacks. Since the charge coupled imaging device is usually driven by drive pulses having a frequency of approximately several MHz through dozens MHz, the pulse width of the clamp pulse applied to the MOS transistor TR11 is very short, for example, several ns (nanoseconds) through ten and several ns. Also, in order to perform a complete clamping operation, it is necessary that the time constant determined by the on-resistance of the MOS transistor TR11 and the capacitance of the capacitor C11 is roughly equal to the pulse width of the clamp pulse. However, because of the above-mentioned disadvantages of the conventional correlated double sampling circuit which is fabricated in the CMOS integrated circuit, it is difficult to obtain such optimum value of the time constant determined by the on-resistance of the MOS transistor TR11 and the capacitance of the capacitor C11. Therefore, in the conventional noise reduction circuit including the correlated double sampling circuit and the like, it was difficult to sufficiently remove the reset noises and it was difficult to obtain an image signal having good quality.

SUMMARY OF THE INVENTION

Therefore, it is an object of the present invention to provide a noise reduction circuit for a charge coupled imaging device which does not occupy a large area on an integrated circuit chip and which can sufficiently improve image quality of the charge coupled imaging device.

It is another object of the present invention to provide a noise reduction circuit for a charge coupled imaging device which has a small power consumption and which can sufficiently improve image quality of the charge coupled imaging device.

It is still another object of the present invention to provide a noise reduction circuit for a charge coupled imaging device which can sufficiently eliminate reset noises of an output image signal of the charge coupled imaging device and which can sufficiently improve quality of an image signal obtained by the charge coupled imaging device.

It is still another object of the present invention to provide a noise reduction circuit for a charge coupled imaging device in which a time constant of a correlated double sampling circuit can be easily adjusted to an optimum value so that reset noises of the charge coupled imaging device can be sufficiently eliminated or reduced.

It is still another object of the present invention to provide a noise reduction circuit for a charge coupled imaging device which does not require a buffer circuit at an output portion of the charge coupled imaging device.

It is still another object of the present invention to obviate the disadvantages of the conventional noise reduction circuit for a charge coupled imaging device.

According to an aspect of the present invention, there is provided a noise reduction circuit for a charge coupled imaging device comprising: a biasing circuit which receives an output signal of the charge coupled imaging device and which supplies a predetermined bias potential to the output signal; a clamping circuit which clamps reset potential output portions of a signal that is outputted from the biasing circuit and that has the predetermined bias potential supplied by the biasing circuit to a predetermined reference potential; and a sample and hold circuit which samples and holds signal potential output portions of a signal outputted from the clamping circuit.

In this case, it is preferable that the charge coupled imaging device has a floating diffusion type amplifier which converts signal electric charges obtained by photoelectric conversion into a voltage signal.

It is also preferable that the clamping circuit comprises a clamping capacitor having a first terminal coupled to an output of the biasing circuit and a second terminal, and a clamping transistor having a main current path coupled between the second terminal of the clamping capacitor and a reference potential source and a control gate terminal for receiving clamp pulses.

It is further preferable that the output of the charge coupled imaging device is coupled to the biasing circuit via a coupling capacitor.

It is advantageous that the biasing circuit comprises a resistor coupled between an input of the biasing circuit and a bias potential source.

It is also advantageous that the biasing circuit comprises a transistor having a main current path coupled between an input terminal of the biasing circuit and a bias potential source and a control gate terminal for receiving bias clamp pulses.

It is further advantageous that the noise reduction circuit comprises a correlated double sampling circuit.

According to another aspect of the present invention, there is provided a noise reduction circuit for a charge coupled imaging device having a floating diffusion type amplifier which converts signal electric charges obtained by photoelectric conversion into a voltage signal, the noise reduction circuit comprising: a biasing circuit which is coupled to a first input terminal for receiving an output signal of the charge coupled imaging device and which supplies a predetermined bias potential to the first input terminal; a first clamping circuit which clamps reset potential output portions of a signal that is outputted from the biasing circuit and that has the predetermined bias potential supplied by the biasing circuit to a predetermined reference potential; a second clamping circuit which is coupled to a second input terminal coupled to the ground and which clamps a potential of the second input terminal to the predetermined reference potential; a reference potential source for providing the predetermined reference potential; a first sample and hold circuit which samples and holds signal potential output portions of a signal outputted from the first clamping circuit by using sampling pulses; a second sample and hold circuit which samples and holds an output of the second clamping circuit by using the sampling pulses; and a subtracter circuit which subtracts an output of the second sample and hold circuit from an output of the first sample and hold circuit.

In this case, it is preferable that the noise reduction circuit is formed as an integrated circuit.

It is also preferable that the first clamping circuit comprises a first clamping capacitor having a first terminal coupled to an output of the biasing circuit and a second terminal, and a first clamping transistor having a main current path coupled between the second terminal of the first clamping capacitor and a reference potential source and a control gate terminal for receiving clamp pulses, and wherein the second clamping circuit comprises a second clamping capacitor having a first terminal coupled to the ground and a second terminal, and a second clamping transistor having a main current path coupled between the second terminal of the second clamping capacitor and the reference potential source and a control gate terminal for receiving the clamp pulses.

It is further preferable that the output of the charge coupled imaging device is coupled to the biasing circuit via a coupling capacitor.

It is advantageous that the noise reduction circuit comprises a correlated double sampling circuit.

According to still another aspect of the present invention, there is provided a noise reduction circuit for a charge coupled imaging device having a floating diffusion type amplifier which converts signal electric charges obtained by photoelectric conversion into a voltage signal, the noise reduction circuit comprising: a biasing circuit which is coupled to an input terminal for receiving an output signal of the charge coupled imaging device and which supplies a predetermined bias potential to the input terminal; a clamping circuit which clamps reset potential output portions of a signal that is outputted from the biasing circuit and that has the predetermined bias potential supplied by the biasing circuit to a predetermined reference potential; a first sample and hold circuit which samples and holds reference potential output portions of a signal outputted from the clamping circuit by using first sampling pulses; a second sample and hold circuit which samples and holds signal potential output portions of the signal outputted from the clamping circuit by using second sampling pulses; a third sample and hold circuit which samples and holds an output of the first sample and hold circuit by using the second sampling pulses; and a subtracter circuit which subtracts an output of the third sample and hold circuit from an output of the second sample and hold circuit.

In this case, it is preferable that the noise reduction circuit is formed as an integrated circuit.

It is also preferable that the clamping circuit comprises a clamping capacitor having a first terminal coupled to an output of the biasing circuit and a second terminal, and a clamping transistor having a main current path coupled between the second terminal of the clamping capacitor and a reference potential source and a control gate terminal for receiving clamp pulses.

It is further preferable that the output of the charge coupled imaging device is coupled to the biasing circuit via a coupling capacitor.

It is advantageous that the biasing circuit comprises a transistor having a main current path coupled between an input terminal of the biasing circuit and a bias potential source and a control gate terminal for receiving bias clamp pulses.

It is also advantageous that the noise reduction circuit comprises a correlated double sampling circuit.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which:

FIG. 3A through FIG. 3C are waveform diagrams illustrating operation of each of the correlated double sampling circuits of FIG. 2;

FIG. 4 is a circuit diagram showing a detailed circuit of a circuit portion from an output of a charge coupled imaging device to an input of a correlated double sampling circuit in the charge coupled imaging apparatus of FIG. 1;

FIG. 5 is a block circuit diagram showing a detailed structure of a correlated double sampling circuit as a noise reduction circuit according to another embodiment of the present invention;

FIG. 6A through FIG. 6C are waveform diagrams illustrating operation of a biasing circuit in the correlated double sampling circuit of FIG. 5;

DESCRIPTION OF A PREFERRED EMBODIMENT

With reference to the drawings, embodiments of the present invention will now be described in detail.

[Embodiment 1]

Figure 1:
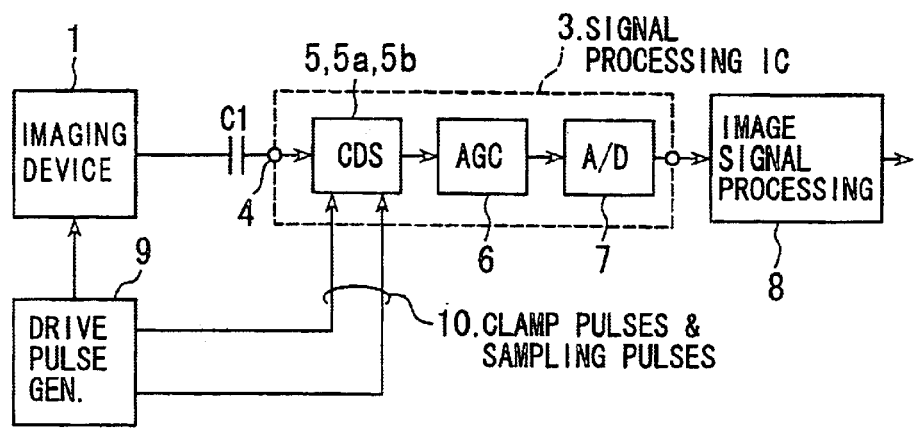
FIG. 1 is a schematic block circuit diagram showing a structure of a charge coupled imaging apparatus to which an integrated noise reduction circuit according to an embodiment of the present invention is applied.

FIG. 1 shows a schematic structure of a charge coupled imaging apparatus which uses a floating diffusion type amplifier and to which an integrated noise reduction circuit according to an embodiment of the present invention is applied.

The charge coupled imaging apparatus of FIG. 1 comprises a charge coupled imaging device 1, a coupling capacitor C1, a signal processing integrated circuit (a signal processing IC) 3, an image signal processing circuit or video signal processing circuit 8, and a drive pulse generating circuit 9. The charge coupled imaging device 1 has a floating diffusion type amplifier not shown in the drawing. The signal processing IC 3 comprises a correlated double sampling circuit (CDS circuit) 5, an AGC circuit 6 and an A/D converter 7. The drive pulse generating circuit 9 generates various drive pulses supplied to the charge coupled imaging device 1, clamp pulses and sampling pulses supplied to the correlated double sampling circuit 5, and the like. The image signal processing circuit 8 performs well known image signal processing, for example, a signal processing to produce a composite video signal, and the like.

In the charge coupled imaging apparatus of FIG. 1, an output signal of the charge coupled imaging device 1 is supplied via the coupling capacitor C1 to the correlated double sampling circuit 5 in the signal processing IC 3. The drive pulse generating circuit 9 drives the charge coupled imaging device 1 by supplying appropriate drive pulses thereto. The drive pulse generating circuit 9 also supplies two kinds of pulses, i.e., clamp pulses and sampling pulses 10, which are synchronized with the drive pulses for the charge coupled imaging device 1, to the correlated double sampling circuit 5. The correlated double sampling circuit 5 removes the reset noises of the floating diffusion type amplifier. An output signal of the correlated double sampling circuit 5 in which the reset noises are removed is supplied to the AGC circuit 6 and the amplitude of the output signal is adjusted to a predetermined magnitude. The A/D converter 7 converts an output signal of the AGC circuit 6 into a digital signal which is then supplied to the image signal processing circuit 8 to produce an output image signal or video signal.

Figure 8:
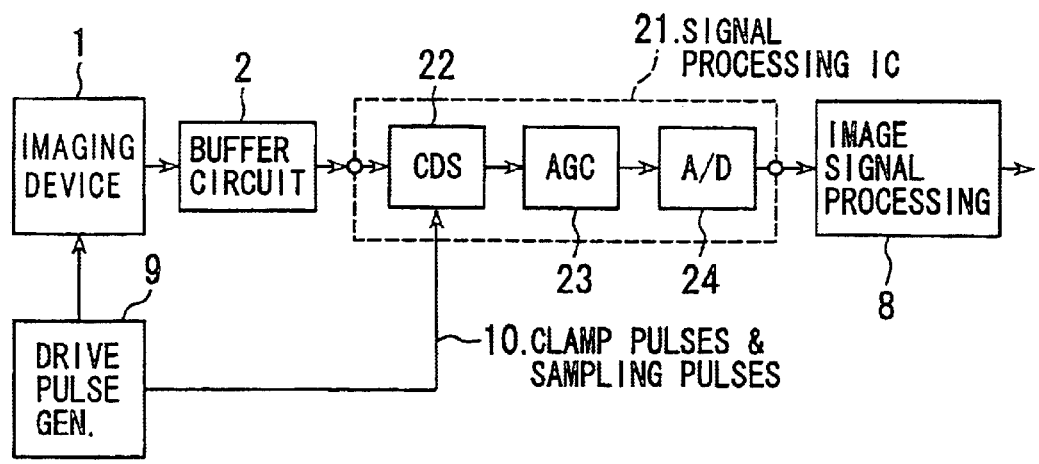
FIG. 8 is a schematic block circuit diagram showing a structure of a charge coupled imaging apparatus in which a conventional noise reduction circuit is used.

As in the conventional example of FIG. 8, the correlated double sampling circuit 5, the AGC circuit 6 and the A/D converter 7 shown in FIG. 1 are integrated into one signal processing IC 3 which can be constituted of a CMOS integrated circuit, because of a power consumption, an integration degree and the like.

Figure 2:
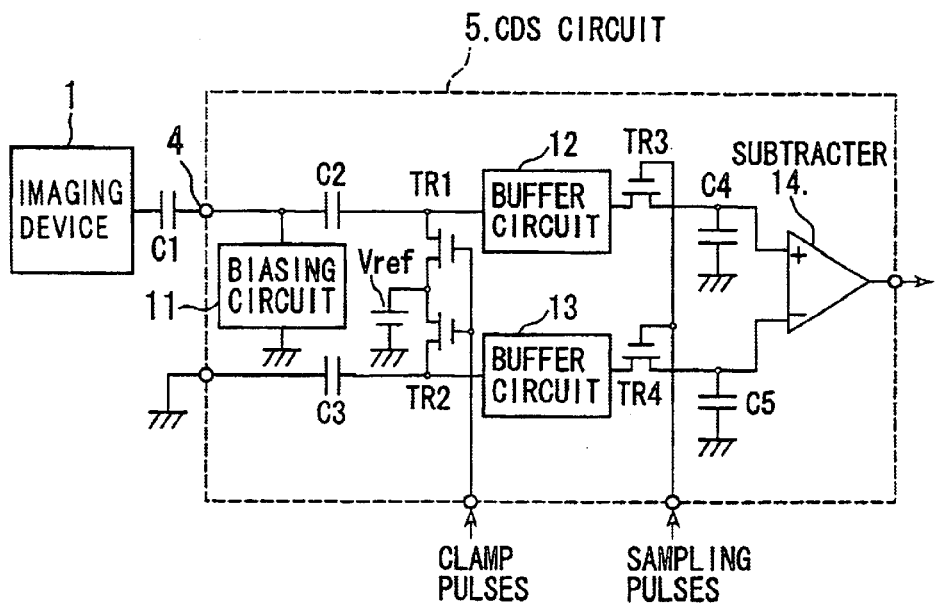
FIG. 2 is a block circuit diagram showing a detailed structure of a correlated double sampling circuit as a noise reduction circuit used in the charge coupled imaging apparatus of FIG. 1.
Figure 9:
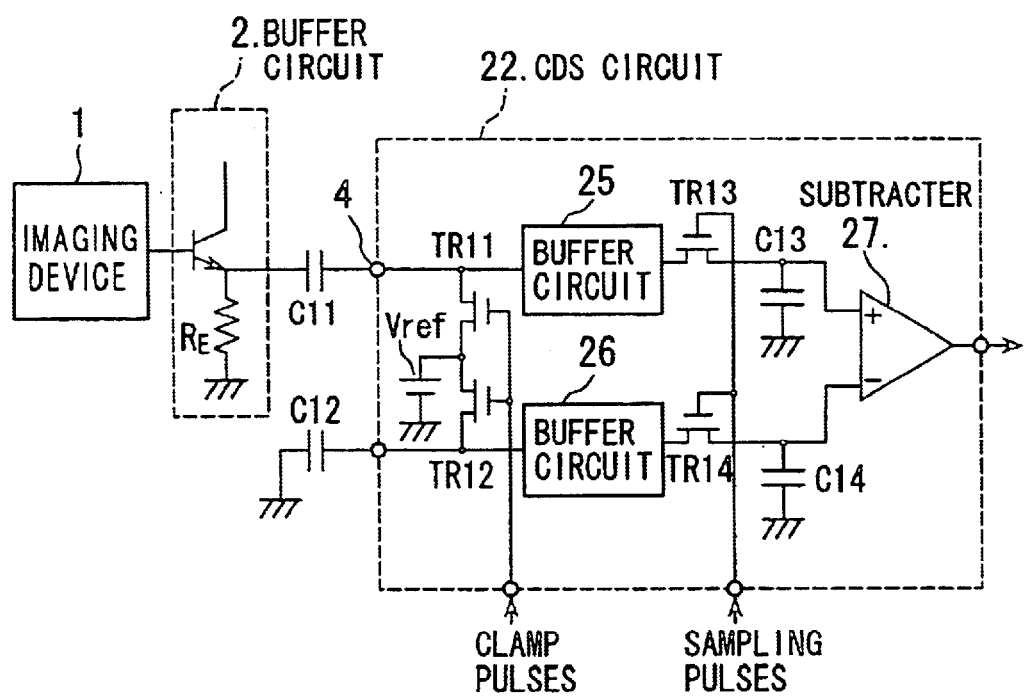
FIG. 9 is a block circuit diagram showing a detailed circuit structure of a correlated double sampling circuit in accordance with the prior art.

FIG. 2 shows detailed circuit structure of the correlated double sampling circuit 5 and the like among various components of the signal processing IC 3. In FIG. 2, the charge coupled imaging device 1 is a charge coupled imaging device having a floating diffusion type amplifier similarly to that shown in FIG. 9. An output signal of the charge coupled imaging device 1 is supplied, via a capacitor C1, to an input 4 of the correlated double sampling circuit 5 which is shown in a box of broken line in FIG. 2 and which is included in the signal processing IC 3 (FIG. 1).

In the correlated double sampling circuit 5, the output signal from the charge coupled imaging device inputted to the input terminal 4 via the coupling capacitor C1 is biased to a predetermined bias potential by the biasing circuit 11, and is then coupled to a clamp capacitor C2. The biasing circuit 11 is, for example, a resistor coupled between a signal line, i.e., an input terminal 4 of the correlated double sampling circuit 5 and a bias potential source, for example, the ground. A MOS transistor TR1 and the clamp capacitor C2 compose a clamping circuit, which clamping circuit clamps reset potential portions in the output signal of the charge coupled imaging device 1 to a predetermined potential Vref by using clamp pulses supplied from the drive pulse generating circuit 9 (FIG. 1). In this structure, the external coupling capacitor C1 functions differently from the capacitor C11 of the conventional circuit of FIG. 9, and functions only as a coupling capacitor. On the other hand, the capacitor C2 of FIG. 2 functions as a capacitor for performing clamping operation to eliminate noises in the correlated double sampling circuit 5. The capacitor C2 are constituted as an internal element of the integrated circuit.

Here, an explanation will be made on a function of the coupling capacitor C1. The output signal of the charge coupled imaging device 1 has a DC potential component which determines a DC operating point. The DC potential component is usually about several volts (V) through ten and several volts. On the other hand, an withstanding voltage of the signal input terminal 4 of the correlated double sampling circuit 5 composed of an integrated circuit such as a CMOS circuit is usually equal to or lower than approximately 5 volts. Therefore, the DC potential of the output signal of the charge coupled imaging device 1 usually becomes larger than the withstanding voltage of the signal input terminal 4 of the correlated double sampling circuit 5. Thus, the external coupling capacitor C1 functions to shut off the DC potential component of the output signal so that the DC potential of the output signal of the charge coupled imaging device 1 is not applied to the input terminal 4 of the correlated double sampling circuit 5. It is also possible to dispose the coupling capacitor C1 within the signal processing IC 3, or to dispose it within the charge coupled imaging device 1.

Since the output signal of the charge coupled imaging device 1 is applied to the input terminal 4 while the DC component of the output signal is shut off by the coupling capacitor C1, the biasing circuit 11 is used for providing a predetermined operating point potential to an internal circuit of the signal processing ICC 3. The predetermined operating point potential is a potential suitable for operation of the internal circuit, for example, the ground potential in this embodiment. Therefore, the biasing circuit 11 can be composed, for example, of a resistor coupled between a signal path, i.e., the input terminal 4, and a bias potential source which is in this case the ground. The output signal of the charge coupled imaging device 1 to which the predetermined operating point potential is applied is then supplied to the capacitor C2.

As mentioned before, it is not the capacitor C1 but the capacitor C2 that is used as a capacitor for performing clamping operation to eliminate or reduce noises in the correlated double sampling circuit 5. This clamp capacitor C2, together with the MOS transistor TR1, constitute a clamping circuit. The MOS transistor TR1 clamps the reset potential portions of the output signal of the charge coupled imaging device 1 to a predetermined clamp potential Vref under the control of the clamping pulses. The clamped output signal is then supplied to a buffer circuit 12, and an output signal of the buffer circuit 12 is supplied to a MOS transistor TR3. The MOS transistor TR3 and a capacitor C4 compose a sample and hold circuit which samples and holds a signal potential portion of the output signal of the buffer circuit 12, i.e., the output signal of the charge coupled imaging device 1, thereby an image signal is obtained. The obtained image signal is supplied to, for example, a positive input, i.e., a non-inverted input of a subtracting circuit or subtracter 14.

FIG. 3A through FIG. 3C are waveform diagrams showing waveforms of various circuit portions of the correlated double sampling circuit 5 of FIG. 2. FIG. 3A shows a waveform of an output signal of the charge coupled imaging device 1. FIG. 3B and FIG. 3C show waveforms of clamp pulses and sampling pulses, respectively. In these drawings, a period T1 is a period during which a reset operation of the floating diffusion type amplifier of the charge coupled imaging device is performed. A period T2 is a period during which a reference potential is outputted after the reset operation. A period T3 is a period during which a signal potential is outputted. The reference potential during each period T2 suffers from the reset noise every reset operation of one pixel. Therefore, as shown in FIG. 3A, when the reference potential output, for example, at a time t0 is considered as a base, the reference potential varies by Vn1 at a time t1, by Vn2 at a time t3, by Vn3 at a time t5, and so on, because of reset noises. A potential of an output signal produced by signal charges varies from each of the reference potential depending on the quantity of the signal charges. Therefore, as shown in FIG. 3A, the MOS transistor TR1 is turned on by the clamp pulse at the time t1, and the reference potential portion of the output signal of the charge coupled imaging device 1 which has voltage variation Vn1 is clamped to the predetermined potential Vref, thereby the voltage variation caused by the reset noise is removed. Then, at a time t2, the output signal corresponding to the signal electric charges is sampled and held by the sampling pulse, and thereby a signal Vs1 from which the reset noise is removed is obtained.

As mentioned above and as shown in FIG. 3A, in the output signal of the charge coupled imaging device 1, that is, a CCD output signal, when viewed with reference to the reference potential at time t0, the reset noise Vn1 is generated at the time t1, the reset noise Vn2 is generated at the time t3, the reset noise Vn3 is generated at the time t5, and so on. Therefore, in the correlated double sampling circuit 5, the reset noises are removed by turning the MOS transistor TR1 on by the clamp pulses, and by clamping the reference potential portions of the output signal of the charge coupled imaging device to the predetermined potential Vref. In order to completely remove the reset noises, it is necessary to determine a clamping time constant of the on resistance of the MOS transistor TR1 and the capacitance of the clamping capacitor C2 to an optimum value.

By determining the relation between the capacitance of the coupling capacitor C1 and the capacitance of the clamping capacitor C2 so as to satisfy C1>>C2, that is, C1 is sufficiently larger than C2, the clamping time constant does not depend on the capacitance of the coupling capacitor C1, but can be determined only by the capacitance of the clamping capacitor C2. Therefore, when the correlated double sampling circuit 5 is fabricated in the signal processing IC 3 as an integrated circuit, it is not necessary to determine the on resistance and the like of the MOS transistor TR1 depending on the external capacitor C1, contrary to the conventional circuit. It is possible to use a small size transistor as the MOS transistor TR1 whose on resistance can be adjusted taking the capacitance of the clamping capacitor C2 into consideration. Thus, the MOS transistor TR1 does not occupy a large area in an integrated circuit such as a CMOS integrated circuit. Similarly, the reference potential source for providing the predetermined constant voltage Vref can be a potential source having a relatively small voltage supply ability.

Also, each of the characteristic such as on resistance and the like of the MOS transistor TR1 and the capacitance of the capacitor C2 can be easily optimized. As a result, it is possible to obtain an output signal, in which the noises are completely removed, from the correlated double sampling circuit 5. Further, since the static capacitance at the input terminal 4 of the correlated double sampling circuit 5 is approximately equal to the capacitance of the capacitor C2 and is a very small value, it is usually possible to omit the buffer circuit 2 shown in FIG. 8.

FIG. 4 shows an example of a detailed circuit structure of a portion connecting the output signal of the charge coupled imaging device 1 to the input terminal 4 of the correlated double sampling circuit 5. In FIG. 4, a MOS transistor TR5 and a capacitor, i.e., a floating diffusion layer capacitor Cfj constitutes a known floating diffusion type amplifier or a floating diffusion layer amplifier. MOS transistors TR6, TR7, TR8 and TR9 constitute a source follower circuit. Signal electric charges Qs transferred from a horizontal CCD 15 are converted to a voltage signal Vs at the floating diffusion layer capacitor Cfj, by a relation Vs=Qs/Cfj. The voltage signal Vs is outputted to outside via the source follower constituted of the MOS transistors TR6 through TR9. The source follower constituted of the MOS transistors TR6 through TR9 functions to lower an output impedance of the charge coupled imaging device 1 such that the feeble signal voltage Vs of the floating diffusion layer Cfj can be extracted to outside without attenuation. However, as is well known, an output impedance of a source follower circuit is approximately several hundred ohms, and is relatively high. Therefore, it is impossible to drive a large or heavy load by the source follower circuit.

However, in the correlated double sampling circuit 5 according to the present invention, the static capacitance of the input terminal 4 has a very small value which is approximately equal to the capacitance of the clamping capacitor C2. Therefore, the load of the charge coupled imaging device 1 becomes very small and easily driven by such source follower circuit. Therefore, as shown in FIG. 4, it is possible to directly input the output signal obtained from the source follower circuit of the charge coupled imaging device 1 into the correlated double sampling circuit 5, via the coupling capacitor C1 which shut off the DC voltage component of the output signal of the source follower circuit described above. As a result, no buffer circuit is required between the charge coupled imaging device 1 and the correlated double sampling circuit 5.

In FIG. 2, a capacitor C3, a MOS transistor TR2, a buffer circuit 13, a MOS transistor TR4, and a capacitor C5 constitute a circuit having the same structure as the circuit constituted of the capacitor C2, the MOS transistor TR1, the buffer circuit 12, the MOS transistor TR3, and the capacitor C4. An input end of the capacitor C3 is grounded. This circuit is provided for removing an influence of the clamp pulses and the sampling pulses on the above-mentioned image signal supplied to the positive input of the subtracter 14. That is, the output of this circuit is supplied to a negative input or an inverting input of the subtracter 14, and is subtracted from the image signal inputted to the positive input terminal of the subtracter 14, so that an influence of the clamp pulses and the sampling pulses is removed.

The output signal of the correlated double sampling circuit 5 then undergoes a well known image signal or video signal processing to obtain a composite video signal. That is, in the charge coupled imaging apparatus of FIG. 1, the output signal of the correlated double sampling circuit 5 is input to the AGC circuit 6 and the amplitude of the output signal is adjusted to a predetermined magnitude, if necessary, and is converted to a digital signal by the A/D converter 7. The digital signal is then processed in the image signal processing circuit 8 to obtain, for example, a composite video signal.

[Embodiment 2]

FIG. 5 shows a detailed circuit structure of the correlated double sampling circuit 5a according to a second embodiment of the present invention. The correlated double sampling circuit 5a of FIG. 5 is the same as that of FIG. 2, except that a biasing circuit 11a of FIG. 5 differs from the biasing circuit 11 of FIG. 2. The biasing circuit 11a comprises, for example, a MOS transistor whose drain is coupled to a signal line, i.e., an input terminal 4 of the correlated double sampling circuit 5a, whose source is coupled to a bias potential source, such as the ground, and whose gate receives bias clamp pulses.

As shown in FIG. 6A through 6C, the biasing circuit 11a clamps the potential of the output signal of the charge coupled imaging device 1 during each no-signal period, i.e., blanking period, of the output signal to a predetermined potential, for example, the ground potential by a bias clamp pulse, thereby providing a predetermined operational point potential to the output signal of the charge coupled imaging device 1.

[Embodiment 3]

Figure 7:
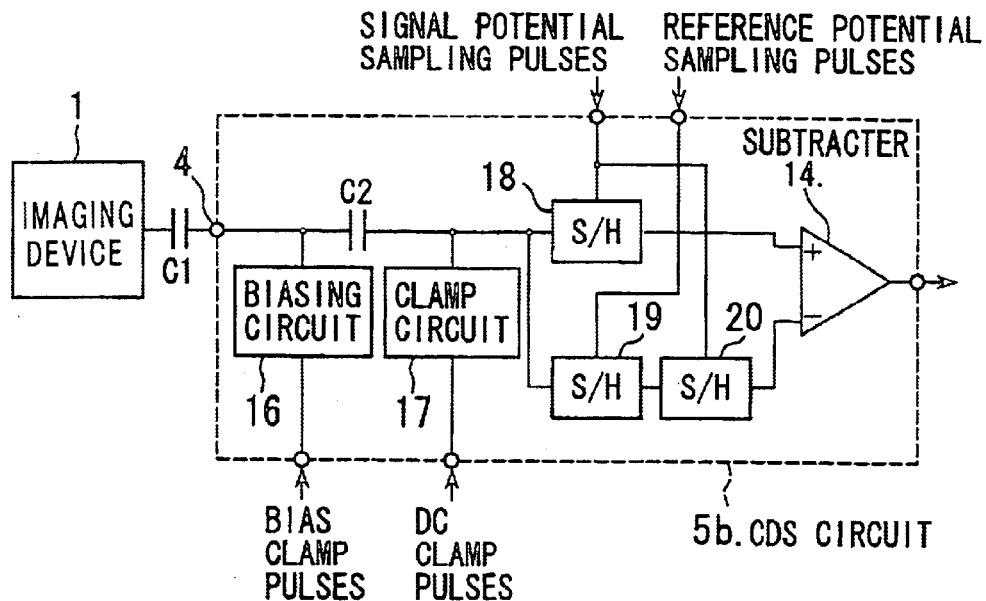
FIG. 7 is a block circuit diagram showing a detailed structure of a correlated double sampling circuit as a noise reduction circuit according to still another embodiment of the present invention.

With reference to FIG. 7, an explanation will be made on a third embodiment of the present invention. FIG. 7 shows detailed circuit structure of the correlated double sampling circuit 5a according to this embodiment and the like. In FIG. 7, the charge coupled imaging device 1 is a charge coupled imaging device having a floating diffusion type amplifier similarly to that shown in FIG. 1 or the like. An output signal of the charge coupled imaging device 1 is supplied, via a capacitor C1, to an input 4 of the correlated double sampling circuit 5b which is shown in a box of broken line in FIG. 7 and which is included in the signal processing IC 3 (FIG. 1).

In the correlated double sampling circuit 5b, the output signal from the charge coupled imaging device 1 inputted to the input terminal 4 via the coupling capacitor C1 is biased to a predetermined bias potential by the biasing circuit 16. The biasing circuit 16 provides a predetermined operational point potential to the output signal of the charge coupled imaging device 1. The biasing circuit 16 in the correlated double sampling circuit 5b is the same as the biasing circuit 11a of FIG. 5. The biasing circuit 16 clamps the potential of the output signal of the charge coupled imaging device 1 during each no-signal period, i.e., blanking period, of the output signal to a predetermined potential, for example, the ground potential by a bias clamp pulse, thereby providing a predetermined operational point potential to the output signal of the charge coupled imaging device 1. However, as the biasing circuit 16, it is possible to use a biasing circuit which has the same structure as that of the biasing circuit 11 shown in FIG. 2 and which applies a DC potential to the output signal at the input terminal 4.

The output signal to which a predetermined operating point potential is provided is then coupled to a clamp capacitor C2. The clamp capacitor C2 and a clamp circuit 17 compose a clamping circuit which may have the same structure as that of the clamping circuit shown in FIG. 2 and composed of the capacitor C2, the MOS transistor TR1 and a reference potential source. The clamping circuit of FIG. 7 determines a DC potential of the output signal of the charge coupled imaging device 1 such that the DC potential level of the output signal matches the operating point potential of sample and hold circuits 18 and 19 at the next circuit stage. The clamping circuit of FIG. 7 clamps the output signal of the charge coupled imaging device 1 to the operating point potential of the sample and hold circuits 18 and 19 during each no-signal period, i.e., blanking period of the output signal of the charge coupled imaging device 1 by a DC clamping pulse.

Then, in the output signal of the charge coupled imaging device 1 which is clamped to the above-mentioned operating point potential, the sample and hold circuit 18 samples and holds each portion of the output signal corresponding to signal electric charges of the charge coupled imaging device 1 by using a signal potential sampling pulse. Similarly, the sample and hold circuit 19 samples and holds each reference potential portion in the output signal of the charge coupled imaging device 1 by using a reference potential sampling pulse. An output period of each output signal corresponding to signal electric charges and an output period of each reference potential differ from each other. Therefore, a sample and hold circuit 20 samples and holds the reference potential of the output signal of the charge coupled imaging device 1 which has been sampled and held by the sample and hold circuit 19 by using the signal potential sampling pulse which is used for sampling and holding the output signal corresponding to signal electric charges of the charge coupled imaging device 1. Thereby, phases of the signal corresponding to the signal charges and the signal corresponding to the reference potential are adjusted to each other. Then, in a subtracter 14, a signal corresponding to a difference between the output signal from the sample and hold circuit 18 and the output signal from the sample and hold circuit 20 is obtained, thereby a signal from which reset noises are removed is obtained. Signal processing thereafter is the same as that of the first embodiment.

As mentioned above, according to the present invention, a clamping capacitor can be fabricated inside an integrated circuit, and the capacitance of the clamping capacitor along with the characteristic, for example, on-resistance, of a clamping transistor which is also fabricated in the integrated circuit can be adjusted to optimum values. Therefore, the characteristic of the clamping circuit can be adjusted to most appropriate condition.

Also, according to the present invention, it is possible to optimize the camping capacitance and the clamping transistor without depending on the capacitance of an external capacitor. Therefore, it becomes possible to constitute a clamping circuit by using a MOS transistor having a small size and a capacitor having a small capacitance value. Also, the area occupied by the clamping circuit can be small, and the capacity or current supply ability of a reference potential source for providing a constant voltage Vref can be small. Therefore, a power consumption of the reference potential source can be small. Further, since a buffer circuit is not required at an output portion of the charge coupled imaging device, power consumption of the charge coupled imaging apparatus can be decreased.

Further, according to the present invention, it is easily possible to optimize a time constant determined by the on-resistance of the MOS transistor TR1 and the capacitor C2, so that reset noises can be sufficiently removed and image quality can be improved. Therefore, it is possible to realize a noise reduction circuit for a charge coupled imaging device which can obviate disadvantages of a conventional device.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A noise reduction circuit for a charge coupled imaging device comprising:

a biasing circuit which receives an output signal of said charge coupled imaging device and which supplies a predetermined bias potential to said output signal;

a clamping circuit which clamps reset potential output portions of a signal that is outputted from said biasing circuit and that has said predetermined bias potential supplied by said biasing circuit to a predetermined reference potential; and a sample and hold circuit which samples and holds signal potential output portions of a signal outputted from said clamping circuit, wherein the noise reduction circuit is formed as an integrated circuit, and wherein said output of said charge coupled imaging device is coupled to said biasing circuit via a coupling capacitor.

2. A noise reduction circuit for a charge coupled imaging device as set forth in claim 1, wherein said charge coupled imaging device has a floating diffusion type amplifier which converts signal electric charges obtained by photoelectric conversion into a voltage signal.

3. A noise reduction circuit for a charge coupled imaging device as set forth in claim 1, wherein said clamping circuit comprises a clamping capacitor having a first terminal coupled to an output of said biasing circuit and a second terminal, and a clamping transistor having a main current path coupled between said second terminal of said clamping capacitor and a reference potential source and a control gate terminal for receiving clamp pulses.

4. A noise reduction circuit for a charge coupled imaging device as set forth in claim 1, wherein said biasing circuit comprises a resistor coupled between an input of said biasing circuit and a bias potential source.

5. A noise reduction circuit for a charge coupled imaging device comprising:

a biasing circuit which receives an output signal of said charge coupled imaging device and which supplies a predetermined bias potential to said output signal;

a clamping circuit which clamps reset potential output portions of a signal that is outputted from said biasing circuit and that has said predetermined bias potential supplied by said biasing circuit to a predetermined reference potential; and a sample and hold circuit which samples and holds signal potential output portions of a signal outputted from said clamping circuit, wherein the noise reduction circuit is formed as an integrated circuit, and wherein said biasing circuit comprises a transistor having a main current path coupled between an input terminal of said biasing circuit and a bias potential source and a control gate terminal for receiving bias clamp pulses.

6. A noise reduction circuit for a charge coupled imaging device as set forth in claim 1, wherein said noise reduction circuit comprises a correlated double sampling circuit.

7. A noise reduction circuit for a charge coupled imaging device having a floating diffusion type amplifier which converts signal electric charges obtained by photoelectric conversion into a voltage signal, said noise reduction circuit comprising:

a biasing circuit which is coupled to a first input terminal for receiving an output signal of said charge coupled imaging device and which supplies a predetermined bias potential to said first input terminal;

a first clamping circuit which clamps reset potential output portions of a signal that is outputted from said biasing circuit and that has said predetermined bias potential supplied by said biasing circuit to a predetermined reference potential;

a second clamping circuit which is coupled to a second input terminal coupled to the ground and which clamps a potential of said second input terminal to said predetermined reference potential;

a reference potential source for providing said predetermined reference potential;

a first sample and hold circuit which samples and holds signal potential output portions of a signal outputted from said first clamping circuit by using sampling pulses;

a second sample and hold circuit which samples and holds an output of said second clamping circuit by using said sampling pulses; and a subtracter circuit which subtracts an output of said second sample and hold circuit from an output of said first sample and hold circuit, wherein said noise reduction circuit is formed as an integrated circuit, and wherein said output of said charge coupled imaging device is coupled to said biasing circuit via a coupling capacitor.

8. A noise reduction circuit as set forth in claim 7, wherein said first clamping circuit comprises a first clamping capacitor having a first terminal coupled to an output of said biasing circuit and a second terminal, and a first clamping transistor having a main current path coupled between said second terminal of said first clamping capacitor and a reference potential source and a control gate terminal for receiving clamp pulses, and wherein said second clamping circuit comprises a second clamping capacitor having a first terminal coupled to the ground and a second terminal, and a second clamping transistor having a main current path coupled between said second terminal of said second clamping capacitor and said reference potential source and a control gate terminal for receiving said clamp pulses.

9. A noise reduction circuit as set forth in claim 7, wherein said noise reduction circuit comprises a correlated double sampling circuit.

10. A noise reduction circuit for a charge coupled imaging device having a floating diffusion type amplifier which converts signal electric charges obtained by photoelectric conversion into a voltage signal, said noise reduction circuit comprising:
   a biasing circuit which is coupled to an input terminal for receiving an output signal of said charge coupled imaging device and which supplies a predetermined bias potential to said input terminal;
   a clamping circuit which clamps reset potential output portions of a signal that is outputted from said biasing circuit and that has said predetermined bias potential supplied by said biasing circuit to a predetermined reference potential;
   a first sample and hold circuit which samples and holds reference potential output portions of a signal outputted from said clamping circuit by using first sampling pulses;
   a second sample and hold circuit which samples and holds signal potential output portions of said signal outputted from said clamping circuit by using second sampling pulses;
   a third sample and hold circuit which samples and holds an output of said first sample and hold circuit by using said second sampling pulses; and
   a subtracter circuit which subtracts an output of said third sample and hold circuit from an output of said second sample and hold circuit,
   wherein said noise reduction circuit is formed as an integrated circuit, and
   wherein said output of said charge coupled imaging device is coupled to said biasing circuit via a coupling capacitor.

11. A noise reduction circuit as set forth in claim 10, wherein said clamping circuit comprises a clamping capacitor having a first terminal coupled to an output of said biasing circuit and a second terminal, and a clamping transistor having a main current path coupled between said second terminal of said clamping capacitor and a reference potential source and a control gate terminal for receiving clamp pulses.

12. A noise reduction circuit for a charge coupled imaging device having a floating diffusion type amplifier which converts signal electric charges obtained by photoelectric conversion into a voltage signal, said noise reduction circuit comprising:
   a biasing circuit which is coupled to an input terminal for receiving an output signal of said charge coupled imaging device and which supplies a predetermined bias potential to said input terminal;
   a clamping circuit which clamps reset potential output portions of a signal that is outputted from said biasing circuit and that has said predetermined bias potential supplied by said biasing circuit to a predetermined reference potential;
   a first sample and hold circuit which samples and holds reference potential output portions of a signal outputted from said clamping circuit by using first sampling pulses;
   a second sample and hold circuit which samples and holds signal potential output portions of said signal outputted from said clamping circuit by using second sampling pulses;
   a third sample and hold circuit which samples and holds an output of said first sample and hold circuit by using said second sampling pulses; and
   a subtracter circuit which subtracts an output of said third sample and hold circuit from an output of said second sample and hold circuit,
   wherein said noise reduction circuit is formed as an integrated circuit, and
   wherein said biasing circuit comprises a transistor having a main current path coupled between an input terminal of said biasing circuit and a bias potential source and a control gate terminal for receiving bias clamp pulses.

13. A noise reduction circuit as set forth in claim 12, wherein said noise reduction circuit comprises a correlated double sampling circuit.

14. A noise reduction circuit for a solid state imaging device having a correlated double sampling circuit integrated on a semiconductor substrate, said noise reduction circuit comprising:
   a biasing circuit which is coupled to a first input terminal for receiving an output signal of said solid state imaging device having a floating diffusion type amplifier via a coupling capacitor having a first capacitance value and which supplies a predetermined bias potential to said first input terminal;
   a first clamping circuit which clamps reset potential output portions of a signal that is outputted from said biasing circuit and that has said predetermined bias potential supplied by said biasing circuit to a predetermined reference potential, wherein said first clamping circuit includes a clamping capacitor having a second capacitance value smaller than said first capacitance value;
   a second clamping circuit which is coupled to a second input terminal coupled to ground and which clamps a potential of said second input terminal to said predetermined reference potential;
   a reference potential source for providing said predetermined reference potential;
   a first sample and hold circuit which samples and holds an output of said first clamping circuit;
   a second sample and hold circuit which samples and holds an output of said second clamping circuit; and
   a subtracter circuit which subtracts an output of said second sample and hold circuit from an output of said first sample and hold circuit.

15. A noise reduction circuit for a solid state imaging device having a correlated double sampling circuit integrated on a semiconductor substrate, said noise reduction circuit comprising:
   a biasing circuit which is coupled to an input terminal for receiving an output signal of said solid state imaging device having a floating diffusion type amplifier via a coupling capacitor having a first capacitance value and which supplies a predetermined bias potential to said input terminal;
   a first sample and hold circuit which samples and holds reference potential output portions in an output signal of said solid state imaging device;

a second sample and hold circuit which samples and holds signal potential output portions in said output signal of said solid state imaging device;

a clamping circuit which clamps an output signal that is outputted from said biasing circuit and that has said predetermined bias potential supplied by said biasing circuit to an operating point potential of said first and second sample and hold circuits, wherein said clamping circuit includes a clamping capacitor having a second capacitance value smaller than said first capacitance value;

a third sample and hold circuit which samples and holds an output of said first sample and hold circuit by using sampling pulses that are the same as sampling pulses of said second sample and hold circuit; and a subtracter circuit which subtracts an output of said third sample and hold circuit from an output of said second sample and hold circuit.

* * * * *